July 25, 1950 I. MOLNAR 2,516,788

TELEPHONE SYSTEM

Filed Nov. 21, 1945 3 Sheets-Sheet 1

INVENTOR.
IMRE MOLNAR

BY

ATTORNEY

INVENTOR.
IMRE MOLNAR
BY
Chas. W. Candy
ATTORNEY

July 25, 1950 | I. MOLNAR | 2,516,788
TELEPHONE SYSTEM
Filed Nov. 21, 1945 | 3 Sheets-Sheet 3

INVENTOR.
IMRE MOLNAR
BY
Chas. M. Candy
ATTORNEY

Patented July 25, 1950 2,516,788

UNITED STATES PATENT OFFICE 2,516,788

TELEPHONE SYSTEM

Imre Molnar, Chicago, Ill., assignor to Automatic Electric Laboratories, Inc., Chicago, Ill., a corporation of Delaware Application November 21, 1945, Serial No. 630,063

14 Claims. (Cl. 179—27)

Figure 4:
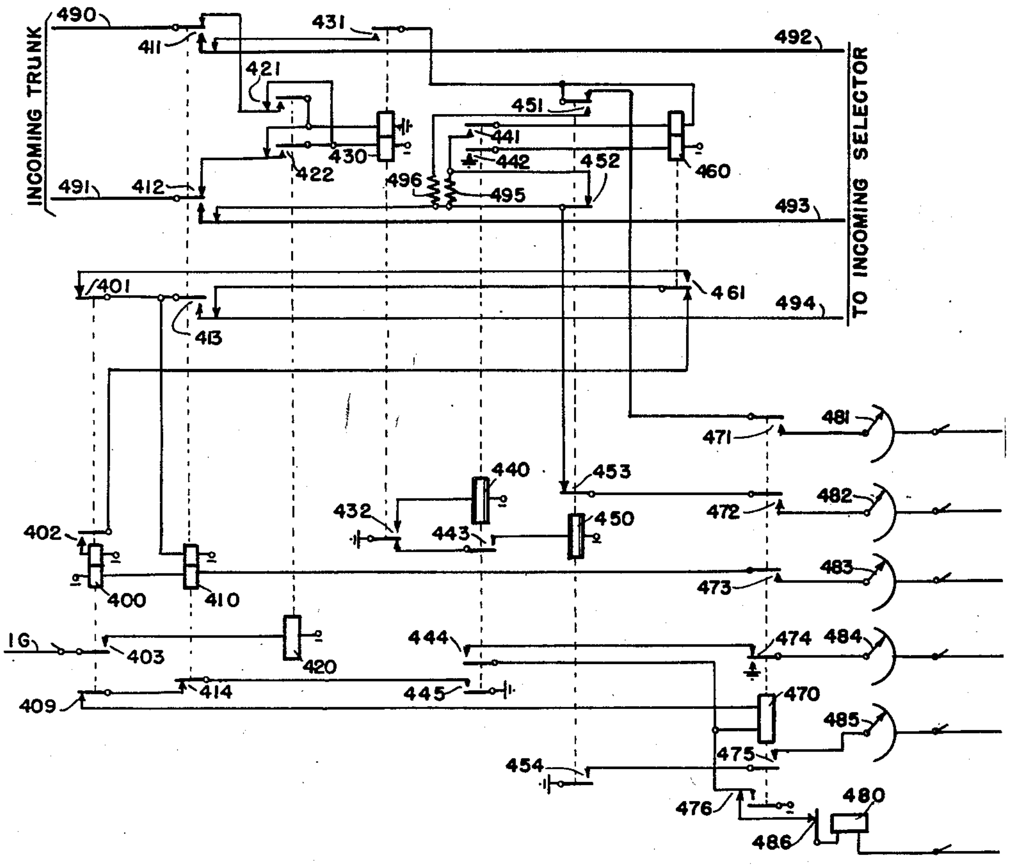

The present invention relates to telephone systems and, more particularly, to improved supervisory signal apparatus of the character disclosed and claimed in Patent No. 2,279,448; granted April 14, 1942; and issued to Thomas F. Crocker.

A telephone system of the character disclosed in the Crocker patent mentioned comprises a switchboard provided with a number of operator positions and a number of groups of switching links individually associated with the operator positions, each operator position comprising equipment operative to select for use any idle one of the switching links in the associated group. Each switching link includes an answer switch and a call switch, the answer switch of a selected switching link being operative to select a calling toll or trunk link accessible thereto, and the call switch of a selected switching link being operative to select a called toll or trunk link accessible thereto. The operation of the answer switch is controlled automatically by a distributor commonly associated with the groups of switching links, while the operation of the call switch is under the control of the position equipment at the associated operator position.

In a telephone system of this character, an operator frequently disconnects a switching link in use from the position equipment at the associated operator position after the operation of the call switch thereof has been determined but prior to the complete operation of the call switch, particularly when the switching link is utilized to extend a connection to a local subscriber substation. In order to signal the operator in the event that the called local subscriber substation is found to be busy incident to the complete operation of the local switch train, improved switching apparatus, including an electronic tone detector, is disclosed in the aforementioned Crocker patent to translate the busy tone signal returned from the local switch train into a visual busy signal at the operator position associated with the switching link over which the call is extended.

In this prior system the electronic tone detectors are employed only on local calls since all outgoing trunks terminate in operator positions located in the distant offices, calls to subscribers in these offices being completed by the operators thereat. When the outgoing trunks terminate in incoming selectors at the distant offices so that calls to subscribers located therein may be completed by the originating operator, it is desirable that the originating operator be enabled to disconnect the switching link in use from the position equipment prior to the completion of the connection, in the same manner as for calls extended to local subscribers, in order to free the operator for a new call. In order to provide supervision to the operator under these conditions it has heretofore been necessary to either employ a special toll switch train in the distant offices which returns a flash busy indication over the trunk to the switching link, if the called line is in use, in place of the usual busy tone signal, or to rely on the electronic tone detector associated with the switching link to convert the busy tone signal returned over the trunk by a local switch train in the distant office into a visual busy signal at the operator position associated with said switching link. There are many instances when it is uneconomical, or otherwise undesirable, to employ toll switch trains in the distant offices. While it is theoretically possible to employ local switch trains in these offices and rely on the tone detectors in the originating office to convert the busy tone signals into visual signals, such operation is not entirely satisfactory due to variations in the level of the busy tone returned from different distant offices and due to the presence of inductive disturbances on the trunks which may, for example, be produced by neighboring power lines.

It is accordingly an object of the present invention to provide an improved switching apparatus, which may be located in the terminating office of an inter-office connection, and which is operative to repeat audio frequency supervisory signals transmitted thereto from a local switch train in the terminating office as a characteristic direct current signal over the inter-office trunk, whereby an operator located in the originating office receives the same supervision as would normally be obtained from a toll switch train in the terminating office.

A further object of the invention is to provide an improved switching apparatus in accordance with the preceding object wherein a small number of electronic tone detectors are enabled to serve a large number of inter-office trunks.

Another object of the invention is to provide a switching apparatus of the character described in which tone detectors commonly associated with a group of trunk circuits include provisions for effecting their release from a trunk circuit in use in response to either a busy tone signal, a ring back tone signal, or the lapse of a predetermined time interval following the transmission of a digit.

Figure 1:
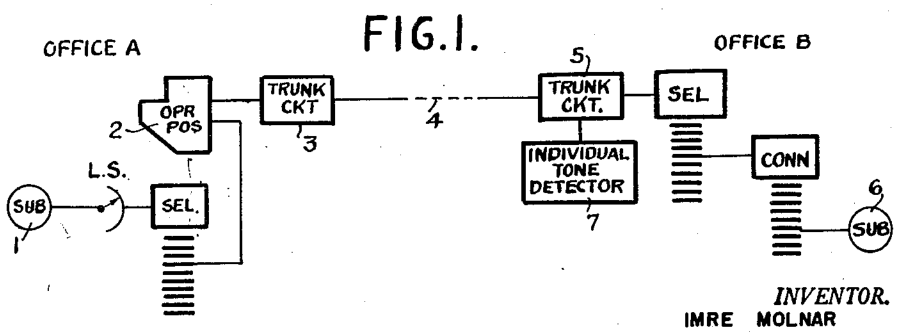
Figure 5:
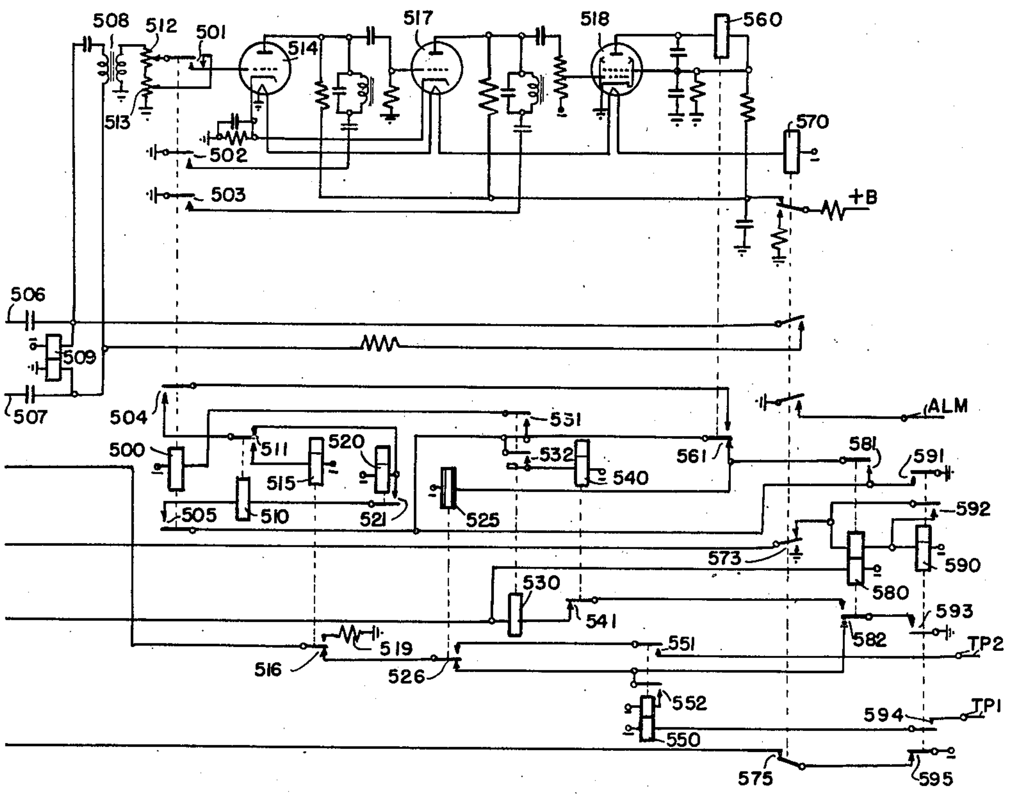
Figure 2:
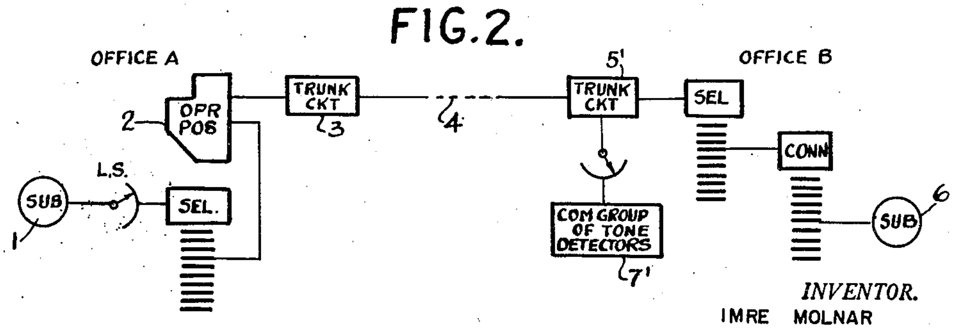
Figure 3:
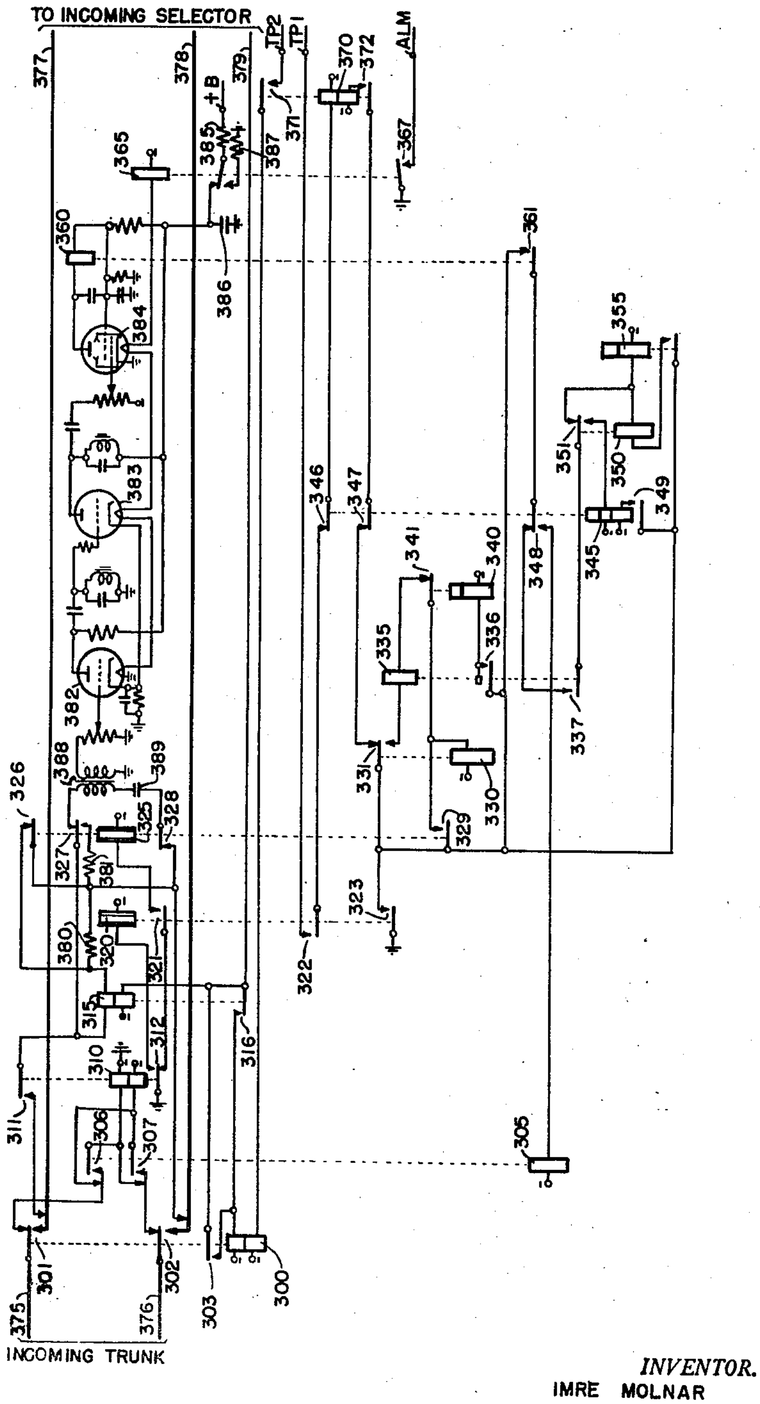

These and other objects of the invention will be more fully appreciated upon a further perusal of the specification taken in conjunction with the accompanying drawings, in which;

Fig. 1 illustrates the general arrangement of a telephone system wherein tone detectors are individually associated with inter-office trunks, Fig. 2 illustrates the general arrangement of a telephone system wherein a common group of tone detectors serve a number of inter-office trunks, Fig. 3 is a schematic diagram of a trunk circuit and associated tone detector which may be employed in the system shown in Fig. 1, Fig. 4 is a schematic diagram of a trunk circuit which may be employed in the system shown in Fig. 2, and Fig. 5 is a schematic diagram of one of a group of tone detectors which may be commonly associated with a group of trunk circuits such as that shown in Fig. 4.

Briefly considered, the invention comprises a trunk circuit which is connected between the terminating end of an inter-office trunk and an incoming selector. A plurality of electronic tone detectors; which are operative to convert audio frequency supervisory signals, such as busy tone, into direct current signals suitable for relay operation; are either individually associated with corresponding ones of a group of the trunk circuits, or are commonly associated with the group of trunk circuits. In the latter case means are provided for connecting an idle one of the tone detectors to a trunk circuit in response to the seizure thereof by a distant operator. The trunk circuit is arranged to repeat call directing impulses from the trunk to the incoming selector and succeeding switches in the usual manner. A conversation channel is not provided until after a connection has been established in order to prevent audio frequency supervisory signals from being returned over the trunk while a connection is being set up. Such signals may otherwise interfere with voice frequency dialling repeaters which may be used in a preceding link of the connection. The tone detector associated with a trunk circuit is rendered operative to test for the presence of busy tone after each series of call directing impulses has been repeated by the trunk circuit. A test after each series of impulses is required since the number of such series required to complete a connection may not be fixed. In the event that a busy condition is encountered, the tone detector causes the polarity of the potential normally applied to the inter-office trunk conductors to be intermittently reversed, thereby causing a visual busy indication to be given an operator at the originating office in the usual manner. In each of the two forms of the invention illustrated, means are provided for establishing a conversation circuit either in response to the answering of a call, or in response to the elapse of a predetermined time interval following the transmission of a series of impulses to the incoming selector or succeeding switches in the local switch train. In the modification employing a common group of tone detectors the tone detector connected to a trunk circuit in use is released when the conversation circuit is established. In this modification the tone detector is also operative to establish a conversation circuit and effect its release from the trunk circuit in response to the return of ring back tone over the local switch train, whereby the length of time during which a tone detector must remain connected with a trunk circuit in use is reduced to a minimum.

Referring now to the drawings, in Figs. 1 and 2 there is shown a subscriber substation 1, located in office A, having access to an operator position 2 via a lineswitch and selector. A call initiated by a calling party at the substation 1 may be extended by an operator at the operation position 2 through an outgoing trunk circuit 3, over an inter-office trunk 4, through an incoming trunk circuit 5 or 5', and over a local switch train to a subscriber substation 6. The incoming circuit 5 has a tone detector 7 individually associated therewith and the incoming trunk circuit 5' has a group of tone detectors 7' commonly associated therewith. The trunk circuit 5 and associated tone detector 7 are shown in detail in Fig. 3. The trunk circuit 5' is shown in detail in Fig. 4 and one of the tone detectors included in the group 7' thereof is shown in Fig. 5. The remaining equipment may follow conventional practice and, since the details of operation thereof are not essential to a complete understanding of the invention, have not been shown in detail.

Referring now specifically to Fig. 3, the trunk circuit illustrated therein is seized from a distant office by the closure of an obvious loop circuit to relay 310 over the inter-office trunk conductors 375 and 376. Relay 310 operates; closes a loop circuit to an associated incoming selector over conductors 377 and 378 through contacts 301 and 311, the upper winding of relay 315, and contacts 326 and 302; and closes a circuit to relay 320 at contacts 312. Relay 320 operates and closes the Time Pulse 1 lead, TP1, to the upper winding of relay 370 at contacts 322. The incoming selector returns ground over the control conductor 379, in response to the closure of a loop circuit thereto, thus completing a circuit to the lower winding of relay 315. The two windings of relay 315 act in opposition at this time.

A number of series of impulses are now transmitted over the trunk conductors 375 and 376 from the distant office to direct the operation of the local switch train, including the incoming selector, in the usual manner. Relay 310 repeats the impulses received over the trunk to the local switch train over conductors 377 and 378 at contacts 311. Relay 310 also closes an intermittent circuit to relay 325 through contacts 321 at contacts 312 during each series of impulses. Relays 320 and 325 are provided with copper sleeves which render them slow to release and consequently enable them to remain operated during impulsing.

During the transmission of each series of impulses, relay 325 operates, cuts resistance 380 in series with the upper winding of relay 315 at contacts 326, connects resistance 381 in parallel with this series combination at contacts 327, and closes a circuit to relay 330 at contacts 329 from ground through contacts 323. Relay 330 operates and closes a holding circuit to itself in series with relay 335 and contacts 341 at contacts 331.

Relay 325 restores shortly after the termination of each series of impulses and opens the operating circuit to relay 330 at contacts 329, thereby removing a short circuit from relay 335. The latter relay operates in series with relay 330 and closes an intermittent circuit to slow-to-operate relay 340 through the weighted spring contacts 336 and contacts 323. After several seconds the amplitude of vibration of the weighted spring contacts 336 is reduced sufficiently to enable relay 340 to operate and open the circuit to relays 330 and 335 at contacts 341. Relays 330 and 335 consequently restore. The restoration of relay 335 permits relay 340 to restore.

The primary winding of transformer 388 is normally bridged across conductors 377 and 378 in multiple with the upper winding of relay 315 and in series with condenser 389 while the trunk circuit is in use. Relay 325 disconnects transformer 388 from the local line at contacts 327 and 328 during impulsing. The secondary winding of transformer 388 is connected in the input circuit of the first stage of an electronic tone detector comprising vacuum tubes 382, 383 and 384, and their associated circuits. The first two stages of the tone detector operate as Class A amplifiers and are tuned to the frequency of the busy tone signal which is at times transmitted over conductors 377 and 378 by the local switch train. The last stage of the tone detector operates as a plate detector. It may be noted that the grid bias for the detector tube 384 is conveniently obtained from the exchange battery, the positive terminal of which is connected to ground. The tubes 382 and 383 may be the two triode sections of a type 12SN7 tube and tube 384 may be a type 25L6 beam power amplifier tube. The heaters of these tubes are energized from the exchange battery in series with relay 365. The latter relay is normally operated and connects the positive terminal of a common B supply to the anodes of tubes 382 to 384 through resistor 385. The negative terminal of the B supply is connected to ground. Resistor 385 and condenser 386 constitute a decoupling filter which prevents interaction between different tone detectors energized from the same B supply. In the event that the heater element of one of the tubes burns out, relay 365 restores, closes an alarm circuit at contacts 367, and disconnects the +B supply lead from the tone detector and transfers it to resistor 387 to maintain the load on the common B supply constant.

In the event that busy tone is returned over conductors 377 and 378, after one or more series of impulses have been transmitted, either in response to an all-trunks-busy or a called line busy condition, relay 360 will be operated during the receipt of each pulse of tone. The busy tone is usually interrupted at a rate between 60 and 120 times per minute. Therefore relay 360 will be operated two or more times during the time interval which elapses between restoration of relay 325 and the operation of relay 340 following the termination of a series of impulses. As relays 330 and 335 are operated during this interval, the first operation of relay 360 closes a circuit from ground through contacts 323, 361, 348, 337 and 351 to relay 355. Relay 355 operates and closes a holding circuit to itself in series with relay 350. When relay 360 restores it opens the operating circuit to relay 355 and removes a short circuit from relay 350 at contacts 361. Relay 350 operates in series with relay 355 and prepares a circuit to the upper winding of relay 345 at contacts 351. When relay 360 operates the second time it completes the circuit to the upper winding of relay 345 at contacts 361. Relay 345 operates, closes a locking circuit to its lower winding through its preliminary make contacts 349, and transfers its operating ground to relay 305 at contacts 348. Relay 305 operates and reverses the connections between the trunk conductors 375 and 376 and the two windings of relay 310 at contacts 306 and 307. Relay 305 follows the succeeding operations of relay 360 to periodically reverse the polarity of conductors 375 and 376 thereby causing the operator in the distant office to receive a "flash-busy" indication in the same manner as usually employed in connection with toll switch trains. The operator will then release the connection by opening the circuit between the trunk conductors, thereby releasing relay 310. When relay 310 restores it opens the circuit between conductors 377 and 378 at contacts 311 to release the local switch train, and opens the circuit to relay 320 at contacts 312. Relay 320 restores after a brief delay and opens the operating and holding grounds for relays 330 to 355 at contacts 323 causing their release.

In the event that a connection is completed to the called line, without encountering an all-trunks-busy condition, and it is found to be idle; ring back tone will be returned over conductors 377 and 378 from the connector switch of the local switch train. The tuned circuits employed in the tone detector ordinarily prevent relay 360 from being operated in response to ring back tone, but the timing system comprising relays 335 to 355 is a further precaution to guard against false operation of relay 305 in response to the ring back tone. This timing system requires that relay 360 be operated at least twice, and each operation must be of sufficient duration to enable operation of one of the slow-to-operate relays 345 and 355, within a few seconds. Since ring back tone signals are usually pulses of one second duration spaced at five second intervals, relay 360 could not be operated twice within the time interval measured by relays 335 and 340 even though it did respond to the pulses of ring back tone.

When the called party answers the direction of current flow over conductors 377 and 378 is reversed by the connector switch of the local switch train in the usual manner. As the two windings of relay 315 then act in aiding relationship, this relay operates and closes ground extended over conductor 379 to the upper winding of relay 300 at contacts 316. Relay 300 operates, switches the trunk conductors 375 and 376 through to conductors 377 and 378 free of all attachments at contacts 301 and 302, and closes a multiple circuit to its upper winding at contacts 303. All operated relays, excepting relays 300 and 365, are now released in response to the restoration of relay 310.

The trunk circuit may also be "switched through" at the end of a predetermined time interval even though no answer signal is received from the called party. If the call was extended to an operator position in the terminating office, for example, no reverse battery signal would be received upon answering of the call by an operator thereat. The timing function is accomplished by relay 370 in conjunction with a common timer which extends ground pulses over leads TP1 and TP2 successively and periodically. Upon seizure of the trunk circuit lead TP1 was connected to the upper winding of relay 370 through contacts 322 and 346. When lead TP1 is momentarily grounded by the timer, not shown, the upper winding of relay 370 is energized, causing it to operate and close a locking circuit to its lower winding from ground through contacts 323, 331, 347 and 372. When relay 330 operates in response to the receipt of a series of impulses it opens the locking circuit to relay 370 at contacts 331 causing it to restore. This cycle of operations is repeated for each received series of impulses until the last series has been transmitted, after which relay 330 is no longer operated. Consequently, the lower winding of relay 300 will be energized through contacts 371 from the momentary ground pulse transmitted over lead TP2 by the timer. Relay 300 operates, switches the trunk through at contacts 301 and 302, and closes a locking circuit to its upper winding at contacts 303 to the ground extended over conductor 379 by the local switch train. The spacing between the ground pulses which are transmitted over conductors TP1 and TP2 by the timer is longer than the normal spacing between successive series of impulses which are received over the trunk, whereby "switching through" will not occur until after the last series of impulses has been received. If a busy condition is encountered, as previously described, the operation of relay 345 opens the operating and locking circuits to relay 370 at contacts 346 and 347 to prevent the subsequent operation of relay 300.

Referring now specifically to Figs. 4 and 5, the trunk circuit illustrated therein is seized from a distant office by the closure of an obvious loop circuit to relay 430 over the inter-office trunk conductors 490 and 491. Relay 430 operates and closes a circuit to relay 440 at contacts 432. Relay 440 operates; closes a loop circuit to the incoming selector over conductors 492 and 493 through contacts 411 and 431, the upper winding of relay 460, and contacts 441 and 412; closes a circuit to the lower winding of relay 460 at contacts 442; closes a circuit from wiper 484 through contacts 474, 444, 476 and 486, rotary switch magnet 480, and to battery through contacts, such as 575 and 595, of idle ones of the tone detectors in the common group thereof; and closes a circuit to relay 470 in series with magnet 480 from ground through contacts 445, 414 and 409. If the tone detector, which is connected to the contacts upon which wipers 481 and 485 are standing, is busy or out of service, wiper 484 will be grounded thereby short-circuiting relay 470 and causing magnet 480 to operate self-interrupting to drive the wipers 481 to 485 until they stand on contacts connected to an idle tone detector. In the case of passing over contacts connected to tone detectors in use, the operating ground for magnet 480 is obtained from operated contacts, such as 474, and a wiper, such as 484, of the trunk circuit with which the tone detector is being used. In the case of passing over contacts connected to tone detectors which are out of service, the operating ground for magnet 480 is obtained from restored contacts, such as 573, of such tone detectors. Assuming that the tone detector illustrated is the first idle one of the group reached by the rotary switch wipers 481 to 485, the short circuit will be removed from relay 470 permitting it to operate in series with magnet 480 when the rotary switch wipers stand on the contacts connected to the illustrated tone detector. The resistance of relay 470 is too high to permit magnet 480 to operate in series therewith. When relay 470 operates it prepares circuits between the trunk circuit of Fig. 4 and the selected tone detector shown in Fig. 5 through wipers 481, 482, 483 and 485 at contacts 471, 472, 473 and 475, respectively; closes ground through contacts 474, wiper 484 and contacts 573 to the upper winding of relay 580 and relay 590 in series; and substitutes direct battery for battery through magnet 480 at contacts 476. Relay 580 operates over the above traced circuit. Relay 590 operates shortly thereafter, being rendered slow-to-operate by means of a copper slug on the armature end of its core, closes ground through contacts 561 and 581 in multiple to relay 525 at contacts 591, short-circuits the upper winding of relay 580 at contacts 592, closes a circuit to the lower winding of relay 580 in series with relay 530 and contacts 541, 582 and 593, and connects lead TP1 to the lower winding of relay 550 at contacts 594. Relay 530 operates, closes a circuit to relay 500 through contacts 591 and 531, and closes an inermittent circuit to slow-to-operate relay 540 through the weighted spring contacts 532. Relay 525 operates over a previously traced circuit. After a delay of several seconds relay 540 operates and opens the series circuit to relays 530 and 580 causing them to restore and release relays 500 and 540. During the time interval measured by relays 530 and 540 a test for the presence of busy tone on the local line conductors 492 and 493 will be made by the tone detector in the manner subsequently described. The reason for making such a test immediately upon seizure of the tone detector is that one or more series of impulses may be transmitted from the trunk circuit to the local switch train before the tone detector is connected thereto, particularly when there is no idle tone detector available at the time the trunk circuit is seized.

Series of impulses received over the trunk conductors 490 and 491 are repeated to the incoming selector, and the succeeding switches in the local switch train, by contacts 431 of relay 430 in the usual manner. Relay 450 operates, from ground through contacts 432 and 443, during the transmission of each series of impulses, disconnects the local line from the input circuit of the tone detector at contacts 451 and 453, cuts resistance 495 in series with the upper winding of relay 460 at contacts 452, shunts the preceding series combination by resistance 496 at contacts 451, and closes a circuit from ground through contacts 454 and 475 and through wiper 485 to the lower winding of relay 580. Relay 580 operates and closes its holding circuit through relay 530 at contacts 582. When relay 450 restores upon the termination of each series of impulses; it connects the input conductor 506 of the tone detector through wiper 481 and contacts 471, 451, 431 and 411 to conductor 492; connects the input conductor 507 of the tone detector through wiper 482 and contacts 472, 453 and 412 to conductor 493; and removes a short circuit from relay 530 at contacts 454. Relay 530 operates causing relay 500 to operate immediately and relay 540 to operate after several seconds delay as previously described. Upon the operation of relay 540, relays 530, 580, 500 and 540 are released in turn.

If a busy tone signal is returned over conductors 492 and 493 it will be impressed on the primary winding of transformer 508 over conductors 506 and 507 and through the blocking condensers in series therewith. The impedance 509 is bridged across the input conductors through the blocking condensers to prevent the introduction of surges in the input circuit of the tone detector at the time that relay 450 restores and connects conductors 506 and 507 to conductors 492 and 493. The busy tone signal induced in the secondary winding of transformer 508 is impressed on potentiometers 512 and 513 in series. As relay 500 is operated at this time the control grid of tube 514 is connected to the adjustable tap on potentiometer 512 through contacts 501, thereby impressing a relatively large portion of the available signal voltage on the input circuit of tube 514. The tone detector comprising tubes 514, 517 and 518 and their associated circuits is substantially identical to that previously described and shown in Fig. 3 except that the tuned circuits included therein are effective only when relay 500 is operated. The busy tone signal is amplified by tubes 514 and 517 and is detected by tube 518 to cause relay 560 to operate in response to each tone pulse. When relay 560 operates the first time it closes a circuit to relay 520 from ground through contacts 591, 561, 504 and 511. Relay 520 operates and closes its holding circuit through contacts 521, relay 510, and contacts 505 and 591. When relay 560 restores it removes a short circuit from relay 510 at contacts 561. Relay 510 operates and prepares a circuit to relay 515 at contacts 511. The second operation of relay 560 causes relay 515 to operate over an obvious circuit and connect ground through resistance 519, contacts 516, wiper 483, and contacts 473 to the lower windings of relays 400 and 410. Relay 410 is margined so as not to operate in series with resistance 519. Relay 400 does operate, however, and closes a locking circuit to its upper winding through contacts 402, 461 and 413 to the ground returned over the control conductor 494 of the local switch train, closes an interrupted ground from lead IG to relay 420 at contacts 403, and opens the circuit to relay 470 at contacts 409. Relay 420 operates intermittently from the interrupted ground on lead IG and periodically reverses the polarity of the potential impressed between conductors 490 and 491 at contacts 421 and 422. This "reverse battery" signal causes a busy indication to be given the distant operator in the same manner as effected over a toll switch train. Relay 470 restores and disconnects the trunk circuit from the tone detector, opening the circuit to relay 590 at contacts 474. Relay 590 restores, opens circuits to relays 500, 510, 515, 520, 525 and 540 at contacts 591, opens circuits to relays 530 and 580 at contacts 593, and disconnects conductor TP1 from relay 550 at contacts 594. The tone detector is thus restored to normal and is free to function with another trunk circuit. When the distant operator releases the trunk in response to receipt of a busy indication, relay 430 restores, opens the loop circuit to the local switch train at contacts 431, and opens the circuit to relay 440 at contacts 432. Relay 440 restores. When the local switch train is released, in response to the opening of the loop circuit thereto, it removes ground from conductor 494 thereby releasing relay 400.

The tone detector repeats the above described test for busy tone upon the termination of each series of impulses transmitted over the trunk circuit. If a connection is completed to the called line and it is found to be idle, ring back tone will be returned over conductors 492 and 493 upon the termination of the last series of impulses. The tone detector functions as previously described to test for busy tone upon the termination of this last series of impulses. When relay 500 restores at the conclusion of the busy tone test it transfers the control grid of tube 514 from potentiometer 512 to potentiometer 513 at contacts 501, thereby lowering the gain of the tone detector, and effectively removes the tuned circuits from the amplifier at contacts 502 and 503. With the tuned circuits of the amplifier disabled, relay 560 is enabled to operate in response to the ring back tone signal impressed on the input of the tone detector. When relay 560 operates it opens the circuit to relay 525 at contacts 561. Relay 525 restores after a brief delay and closes a circuit from ground through contacts 593, 582, 526 and 516, wiper 583, and contacts 473 to the lower windings of relays 400 and 410 in series. Both of these relays operate in this instance but the operation of relay 400 is merely incidental. Relay 410 switches the trunk through clear of attachments at contacts 411 and 412, locks to ground on conductor 494 at contacts 413, and opens the circuit to relay 470 at contacts 414. Relays 470, 400, 430 and 440 restore in turn. When relay 470 restores it disconnects the trunk circuit from the tone detector and opens the circuit to relay 590 at contacts 474 to free the tone detector for another call, as previously described.

In the event that all tone detectors are busy and none is freed for use with a particular trunk circuit during the time that a connection is established thereover, some provision must be made to immediately switch the trunk through when the called party answers. At the time that the called party answers the connector switch of the local switch train reverses the direction of current flow over conductors 492 and 493, thereby causing relay 460 to operate and complete a circuit from grounded conductor 494 through contacts 413, 461 and 401 to the upper winding of relay 410. Relay 410 operates to switch the trunk through clear of attachments as previously described.

In the event that a tone detector is connected to a trunk circuit over which a connection to a vacant terminal is inadvertently established, neither ring back or busy tone will be received over conductors 492 and 493 to operate the tone detector. In order to free the tone detector for another call in such a case, a timing arrangement is provided therein which causes the trunk circuit to switch through and free the tone detector connected thereto if no tone signal is received within a predetermined time interval following the transmission of a digit. Thus when the tone detector is seized relay 590 operates and connects conductor TP1 to the lower winding of relay 550 at contacts 594. Conductors TP1 and TP2 are successively momentarily grounded a predetermined interval by a common timer, not shown. When conductor TP1 is grounded relay 550 operates; closes a locking circuit to its upper winding from ground through contacts 593, 582 and 552; and connects conductor TP2 through contacts 551, 526 and 516, wiper 483, and contacts 473 to the lower windings of relays 400 and 410 in series. Each time that relay 580 operates in response to the transmission of a digit it opens the locking circuit to relay 550, if operated, at contacts 582. After the last digit has been transmitted and a busy tone test has been completed, relay 580 restores as previously described. Since this relay is not again operated relay 550 will remain operated until conductor TP2 is momentarily grounded causing relay 410 to operate over a previously traced circuit. Relay 410 switches the trunk through and frees the tone detector in the same manner as described in response to the receipt of ring back tone.

While particular embodiments of the invention have been illustrated, it is to be understood that numerous modifications may be incorporated therein without departing from the true spirit and scope of the invention as defined in the subjoined claims.

What is claimed is:

1. In a telephone system, an automatic switch train, a first line over which said switch train is directively controlled to extend connections to called subscriber's lines, a second line over which digital impulses are at times received for directing the operation of said switch train, means responsive to the digital impulses received over said second line for repeating corresponding impulses to said first line, said switch train at times operated to transmit a current of an audio frequency as a supervisory signal over said first line in response to a particular condition, and means responsive only to said audio frequency current for transmitting a corresponding direct current signal over said second line.

2. In a telephone system, an automatic switch train, a first line over which said switch train is directively controlled to extend connections to called subscriber's lines, a second line over which digital impulses are at times received for directing the operation of said switch train, means responsive to the digital impulses received over said second line for repeating corresponding impulses to said first line, said switch train operated to transmit an interrupted audio frequency current as a busy tone signal over said first line when the called subscriber's line is in use, and means responsive to said audio frequency current for transmitting a corresponding direct current signal over said second line.

3. In a telephone system, an automatic switch train, a line over which said switch train is directively controlled by digital impulses to extend connections to called subscribers, means operated to transmit impulses representing digits over said line, said switch train at times operated to return current of an audio frequency as a supervisory signal over said line in response to a particular condition, testing means operated in response to each transmission of impulses representing a digit over said line to test for the return of said audio frequency current thereover, said last means further operated to provide a direct current indication in the event that said audio frequency current is returned during a test therefor.

4. In a telephone system, an automatic switch train, a line over which said switch train is directively controlled by digital impulses to extend connections to called subscribers, means operated to transmit digital impulses over said line, said switch train at times operated to return currents of different audio frequency as supervisory signals over said line in response to particular conditions, testing means operated subsequent to the transmission of digital impulses over said line to successively test for the return of said supervisory signals thereover, said testing means further operated to effect one of a plurality of distinctive switching operations in accordance with the particular supervisory signal returned during the test.

5. In a telephone system, an automatic switch train, a first line over which said switch train is directively controlled to extend connections to called subscriber's lines, a second line over which digital impulses are at times received for directing the operation of said switch train, means responsive to the digital impulses received over said second line for repeating corresponding impulses to said first line, said switch train operated to return an interrupted audio frequency current as a tone signal over said first line in response to the extension of a connection to an idle subscriber's line, and means responsive to the return of said audio frequency current for switching said second line through to said first line.

6. In a telephone system, a group of repeaters, incoming and outgoing lines connected to each of said repeaters, a group of tone detectors commonly associated with said repeaters, means responsive to the seizure of one of said repeaters over the incoming line connected thereto for connecting an idle one of said tone detectors to said one repeater, said one tone detector operative, when so connected, to cause a characteristic direct current supervisory signal to be transmitted over the incoming line connected to said one repeater in response to the receipt of an audio frequency supervisory signal over the outgoing line connected thereto.

7. In a telephone system as claimed in claim 6, said first means responsive to the detection of an audio frequency supervisory signal by said one tone detector to disconnect it from said one repeater.

8. In a telephone system, a group of repeaters, incoming and outgoing lines connected to each of said repeaters, a group of tone detectors commonly associated with said repeaters, means responsive to the seizure of one of said repeaters over the incoming line connected thereto for connecting an idle one of said tone detectors to said one repeater, said one tone detector operative, when so connected, to cause a characteristic direct current signal to be transmitted over the incoming line connected to said one repeater in response to the receipt of one audio frequency supervisory signal over the outgoing line connected thereto, or to cause said one repeater to switch through in response to the receipt of a different audio frequency supervisory signal over the outgoing line.

9. In a telephone system, a line over which interrupted tone signals having different rates of interruption are at times transmitted, a tone detector including a thermionic amplifier responsive to tone signals impressed on the input thereof to operate a relay in the output thereof, a plurality of timing means each corresponding to one of said interrupted tone signals, means for at times coupling the input of said tone detector to said line and for successively associating each of said timing means with the tone detector relay, each of said timing means operated to perform a distinctive switching operation in the event that the corresponding tone signal is present on said line.

10. In a telephone system as claimed in claim 9 wherein the interrupted tone signals also have different frequency characteristics, means operated to vary the frequency response characteristics of said tone detector as different ones of said timing means are associated with the tone detector relay.

11. In a telephone system as claimed in claim 9 wherein the interrupted tone signals also have different amplitudes, means operated to vary the sensitivity of said tone detector as different ones of said timing means are associated with the tone detector relay.

12. In a telephone system, a trunk line having direct current flowing therein, an automatic switch train operated at times by impulses over said line to extend a connection to a called line, means in the switch train for transmitting a current of a particular frequency as a busy tone back to the line under certain conditions and for transmitting a current of a different frequency back to the line under other conditions, a tone detector associated with the trunk line responsive to current of said particular frequency, and circuit and relay means operated by the response of said detector for altering the direct current flowing in said trunk line to signal thereover, said tone detector responsive to said different frequency at another time, and relay means responsive to the last mentioned response of said tone detector to perform a switching operation.

13. A telephone system such as claimed in claim 12 in which there is means in the tone detector operated at a certain stage in the extension of the connection to vary the circuits of the tone detector to cause it to respond to said different frequency.

14. In a telephone system, an automatic switch train, a trunk line over which said switch train is directively controlled by digital impulses from a calling party to extend connections to a called line, means controlled responsive to the receipt of digital impulses from a calling party to operate said switch train for completing a connection with a called line over said trunk line, means in said switch train controlled by said called line when busy for transmitting a current of a first audio signal as a busy tone over said trunk line, means in said switch train controlled by said called line when idle for transmitting a current of a second audio signal as a ring back tone over said trunk line, a tone detector associated with said trunk line responsive to the currents of said first and second audio signals, a relay operated by said tone detector responsive to the current of said first audio signal for reversing battery over said trunk line, and another relay operated by said tone detector responsive to the current of said second audio signal for switching said trunk line to complete connections to said called line.

IMRE MOLNAR.

REFERENCES CITED

The following references are of record in the file of this patent:

UNITED STATES PATENTS

| Number | Name | Date |
|---|---|---|
| 1,654,068 | Blattner | Dec. 27, 1927 |
| 1,677,876 | Wicks | July 17, 1928 |
| 1,829,071 | Stazak | Oct. 27, 1931 |
| 2,355,642 | Gose | Aug. 15, 1944 |